United States Patent [19]

Lin

[11] Patent Number: 5,503,212

[45] Date of Patent: Apr. 2, 1996

[54] SOLAR SHIELD DEVICE FOR A VEHICLE

[76] Inventor: Zen C. Lin, No. 7, 34 Lane, 148 Alley, Donna Road, Donna Village Ta-Li town, Taichung, Taiwan

[21] Appl. No.: 391,114

[22] Filed: Feb. 21, 1995

[51] Int. Cl.$^6$ ................................................ B60J 11/00
[52] U.S. Cl. ................ 160/370.22; 160/24; 292/288; 224/315; 296/136
[58] Field of Search .......................... 292/148, 289, 292/288, 295; 160/370.22, 23.1, 24, 903; 296/98, 136; 224/315; 248/552

[56] References Cited

U.S. PATENT DOCUMENTS

| | | | |
|---|---|---|---|
| 2,479,300 | 8/1949 | Binz | 248/552 X |
| 2,963,895 | 12/1960 | Thomas | 292/288 X |
| 4,027,798 | 6/1977 | Swaim | 248/552 X |
| 4,038,843 | 8/1977 | Daley, Jr. | 248/552 X |
| 4,118,066 | 10/1978 | Ricke | 296/136 X |
| 4,184,501 | 1/1980 | Johnson | 296/136 X |
| 4,958,881 | 9/1990 | Piros | 296/136 X |
| 5,419,165 | 5/1995 | Perkins | 292/288 X |
| 5,456,515 | 10/1995 | Dang | 160/370.22 X |

Primary Examiner—Blair M. Johnson
Attorney, Agent, or Firm—Charles E. Baxley

[57] ABSTRACT

A solar shield device includes a cylinder secured to a housing. A sheet material is wound on a reef of the housing and unwound for covering the vehicle. Two bars are slidably engaged in the housing and include a number of holes for engaging with fastening member which may secure the bars together. Two hooks are secured to the bars and oppositely extended outward of the housing. The bars may move toward or away from each other for adjusting relative position between the hooks such that the hooks may hook to the trunk of the vehicle.

1 Claim, 5 Drawing Sheets

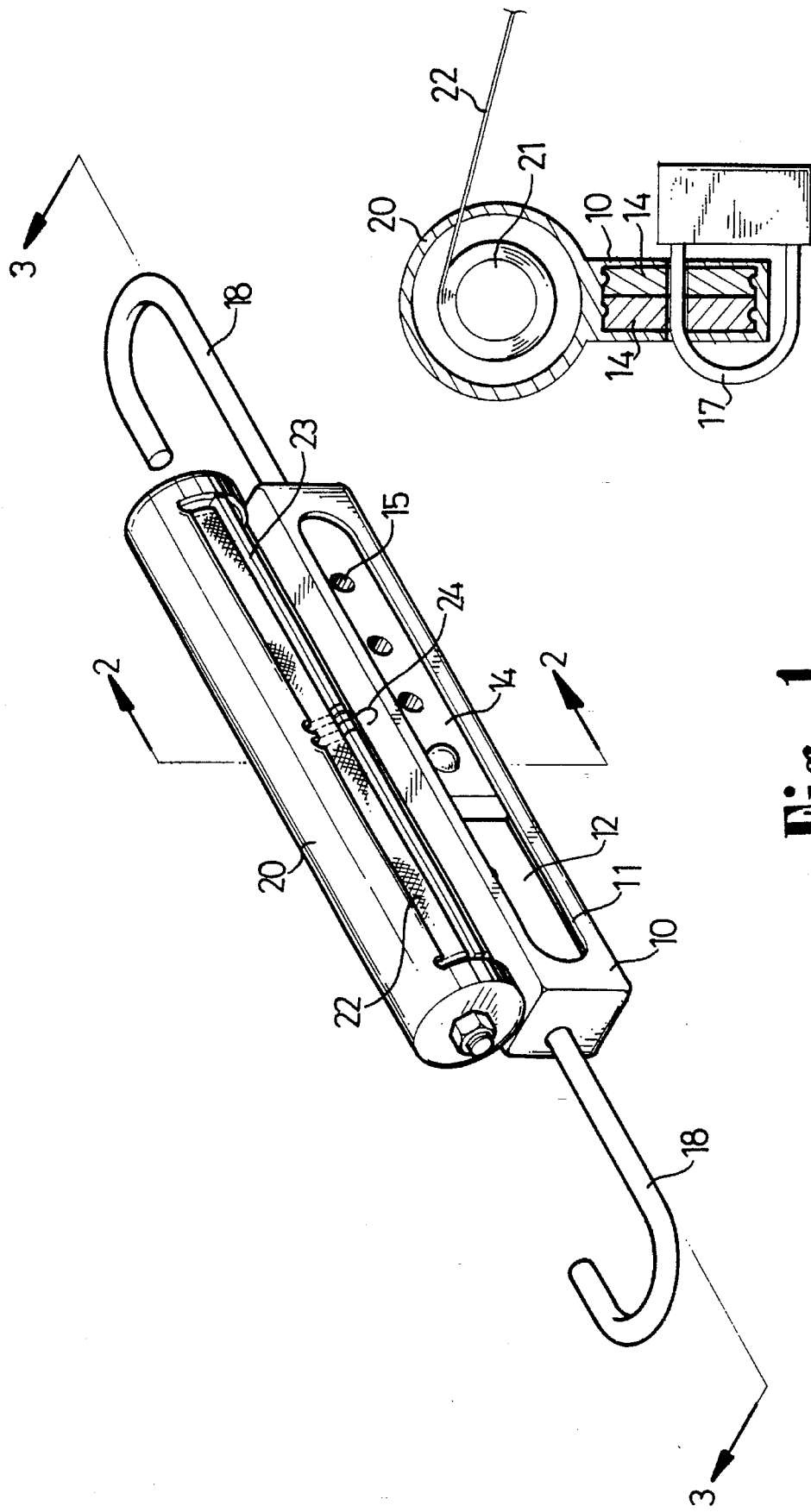

SOLAR SHIELD DEVICE FOR A VEHICLE

BACKGROUND OF THE INVENTION

1. Field of the Invention

The present invention relates to a solar shield, and more particularly to a solar shield device for vehicles.

2. Description of the Prior Art

Typical solar shields for vehicles comprise a housing for securing on top of the vehicle and a sheet material wound and received within the housing. The sheet material is unwound from the housing for covering the vehicles. However, the housing can be easily removed from the vehicle and can be easily stolen.

The present invention has arisen to mitigate and/or obviate the afore-described disadvantages of the conventional solar shields.

SUMMARY OF THE INVENTION

The primary objective of the present invention is to provide a solar shield device which is disposed within the trunk of a vehicle such that the solar shield device will not be easily stolen.

The other objective of the present invention is to provide a solar shield device which includes a pair of hooks that may extend laterally for booking to the trunk of the vehicle.

In accordance with one aspect of the invention, there is provided a solar shield device adapted to be mounted in the trunk of a vehicle. The solar shield device comprises a housing including a hollow interior and including two side portions each having a slot formed therein, a cylinder secured to the housing and including a reel rotatably supported therein, a sheet material engaged on and wound on the reel, the sheet material being unwound from the reel for covering the vehicle, two bars slidably engaged in the hollow interior of the housing and including a plurality of holes formed therein, the bars each including a hook means secured thereto and extended outward of the housing, the two hook means of the bars being oppositely extended outward of the housing and moving in concert with the bars, the bars being moved toward or away from each other for adjusting relative position between the hook means, and fastening means engaged with the holes so as to secure the bars together.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a solar shield device in accordance with the present invention;

FIGS. 2 and 3 are cross sectional views taken along lines 2—2 and 3—3 of FIG. 1 respectively;

DETAILED DESCRIPTION OF THE PREFERRED EMBODIMENT

Figure 3:
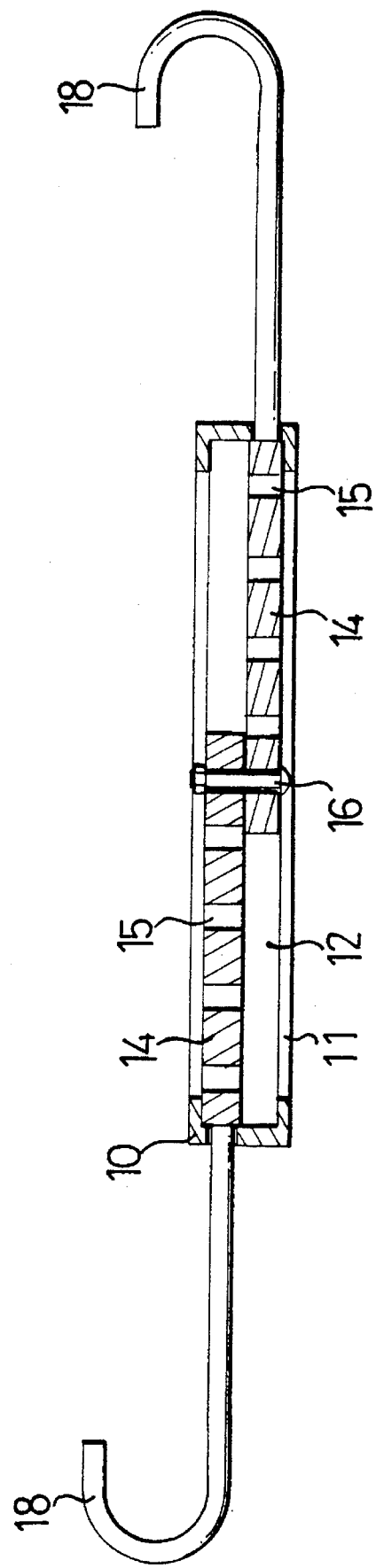
Figure 4:
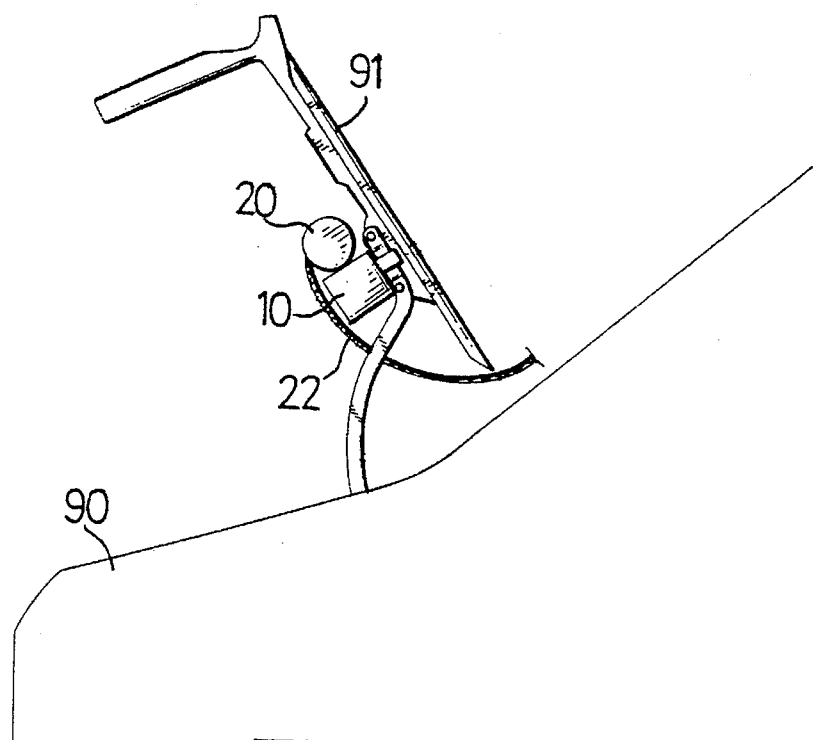
FIG. 4 is a side view illustrating the application of the solar shield device to the vehicle.
Figure 5:
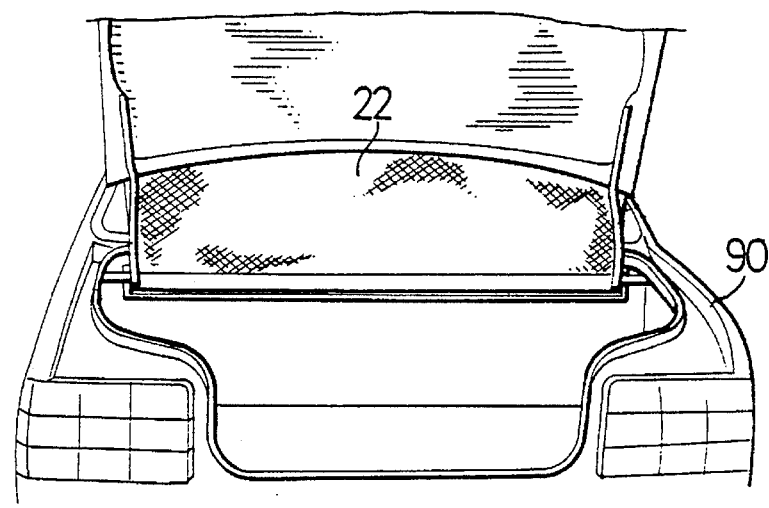
FIG. 5 is a rear view of the vehicle.

Referring to the drawings, and initially to FIGS. 1 to 5, a solar shield device in accordance with the present invention comprises a housing 10 including two side portions each having a slot 11 formed therein. The housing 10 includes a hollow interior having two bars 14 slidably engaged therein. The bars 14 include a number of holes 15 formed therein for aligning with each other so as to engage with a pin element 16 (FIG. 3) or a shank element 17 of a lock device (FIG. 2) such that the two bars 14 may be adjusted relative to each other and may be secured to each other by the fastening means 16, 17. The bars 14 include two hooks 18 oppositely secured to the bars 14 and oppositely extended outward of the housing 10. The hooks 18 move in concert with the bars 14 such that the hooks 18 may be moved toward each other or moved away from each other and such that the hooks 18 may hook to suitable place within the trunk of the vehicle (FIG. 4).

Figure 9:
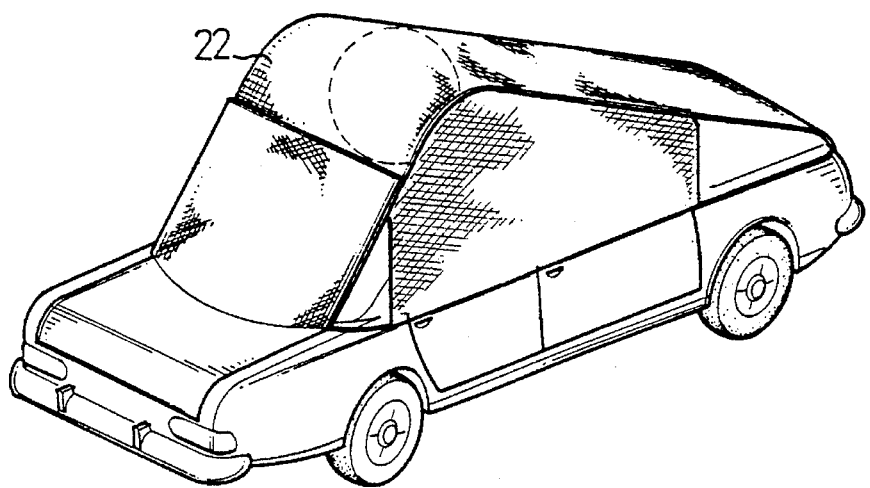
FIGS. 8 and 9 are perspective views showing the applications of the solar shield device.
Figure 8:
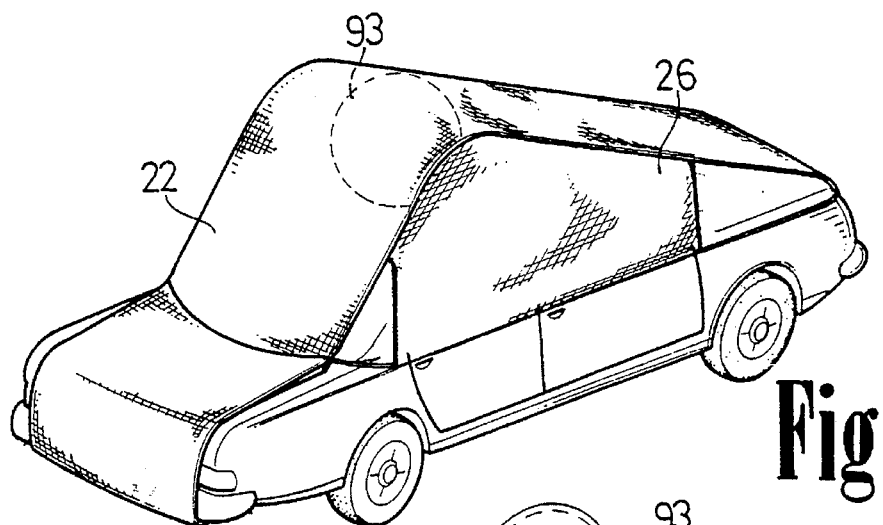
Figure 7:
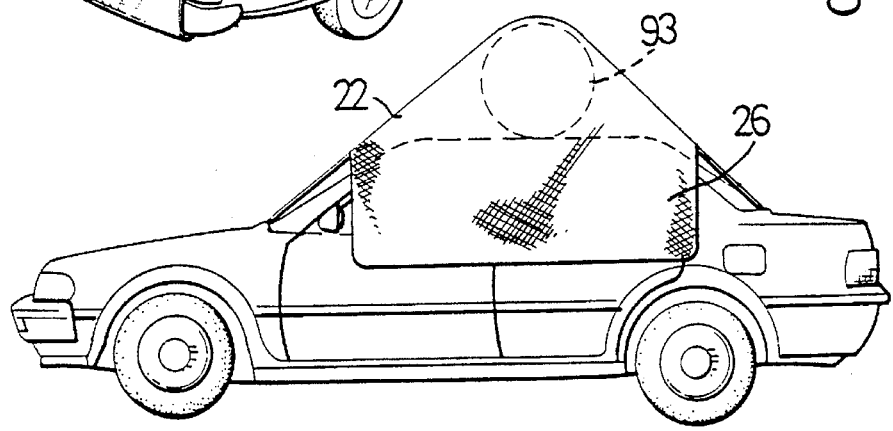
FIG. 7 is a side view of the vehicle showing the application of the solar shield device.

A cylinder 20 is secured to the housing 10 and includes a spring loaded reel 21 therein for winding a sheet material 22 which includes a free edge having a beam 23 secured thereto and having a hook 24 secured to the beam 23. The sheet material 22 may extend through the gap formed between the rear cover 91 and the rear portion of the vehicle 90 (FIG. 4) for covering the middle portion of the vehicle (FIG. 7). The sheet material 22 may also extend outward of the trunk via the rear portion of the vehicle (FIGS. 8 and 9). Other objects 93 may also be covered by the sheet material 22 and be maintained in place by the sheet material 22.

Figure 6:
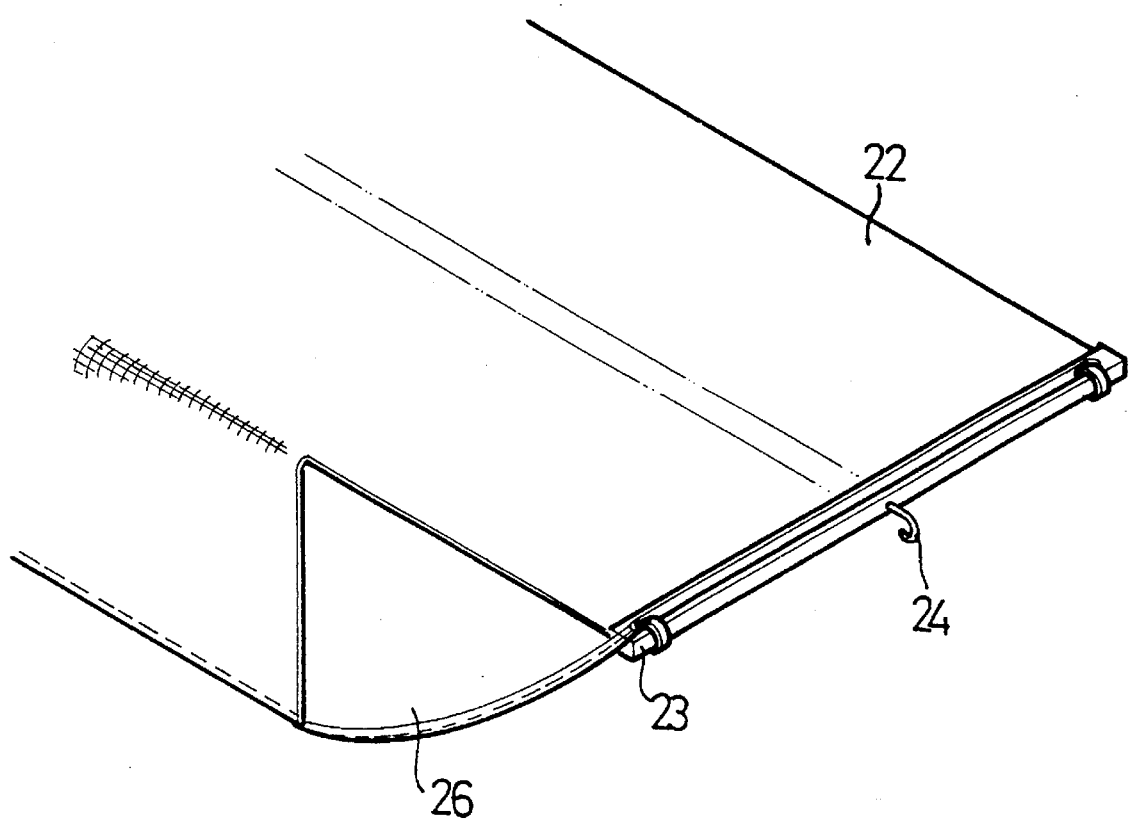
FIG. 6 is a partial perspective view showing the sheet material.

Referring next to FIG. 6, the sheet material 22 may include a pair of side panels 26 secured thereto for covering the side portions of the vehicle.

Accordingly, the solar shield device in accordance with the present invention includes a pair of hooks that may be moved toward or away from each other for hooking to the trunk of the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solar shield device adapted to be mounted in the trunk of a vehicle, said solar shield device comprising:

a housing including a hollow interior and including two side portions each having a slot formed therein, a cylinder secured to said housing and including a reel rotatably supported therein, a sheet material engaged on and wound on said reel, said sheet material being unwound from said reel for covering said vehicle, two bars slidably engaged in said hollow interior of said housing and including a plurality of holes formed therein, said bars each including a hook means secured thereto and extended outward of said housing, said two hook means of said bars being oppositely extended outward of said housing and moving in concert with said bars, said bars being moved toward or away from each other for adjusting relative position between said hook means, and fastening means engaged with said holes so as to secure said bars together.

* * * * *